No. 703,429. Patented July 1, 1902.
C. KÜNZELMANN.
LOCK.
(Application filed Aug. 20, 1898.)
(No Model.) 4 Sheets—Sheet 1.

Witnesses:

Inventor
Carl Künzelmann
by Wm. A. Rosenbaum
Atty.

No. 703,429. Patented July 1, 1902.
C. KUNZELMANN.
LOCK.
(Application filed Aug. 20, 1898.)
(No Model.) 4 Sheets—Sheet 2.
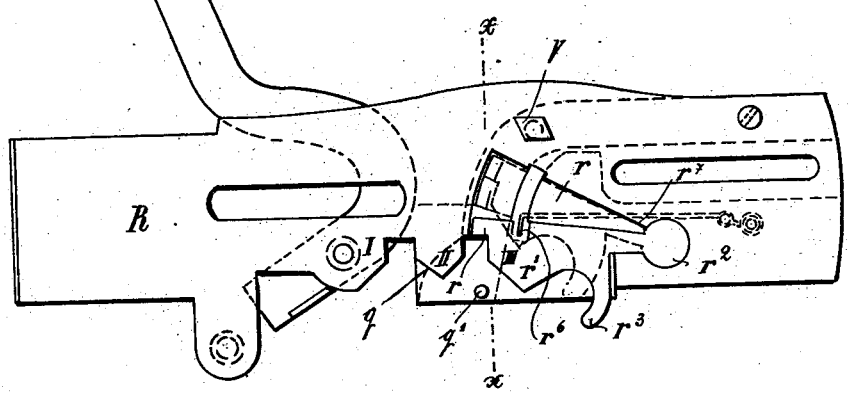
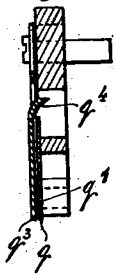
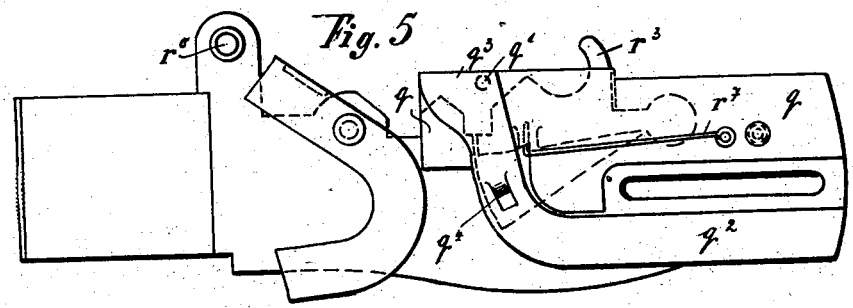
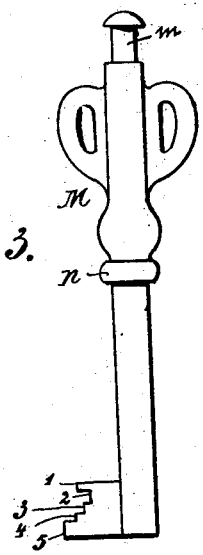
Witnesses
Inventor
Carl Kunzelmann

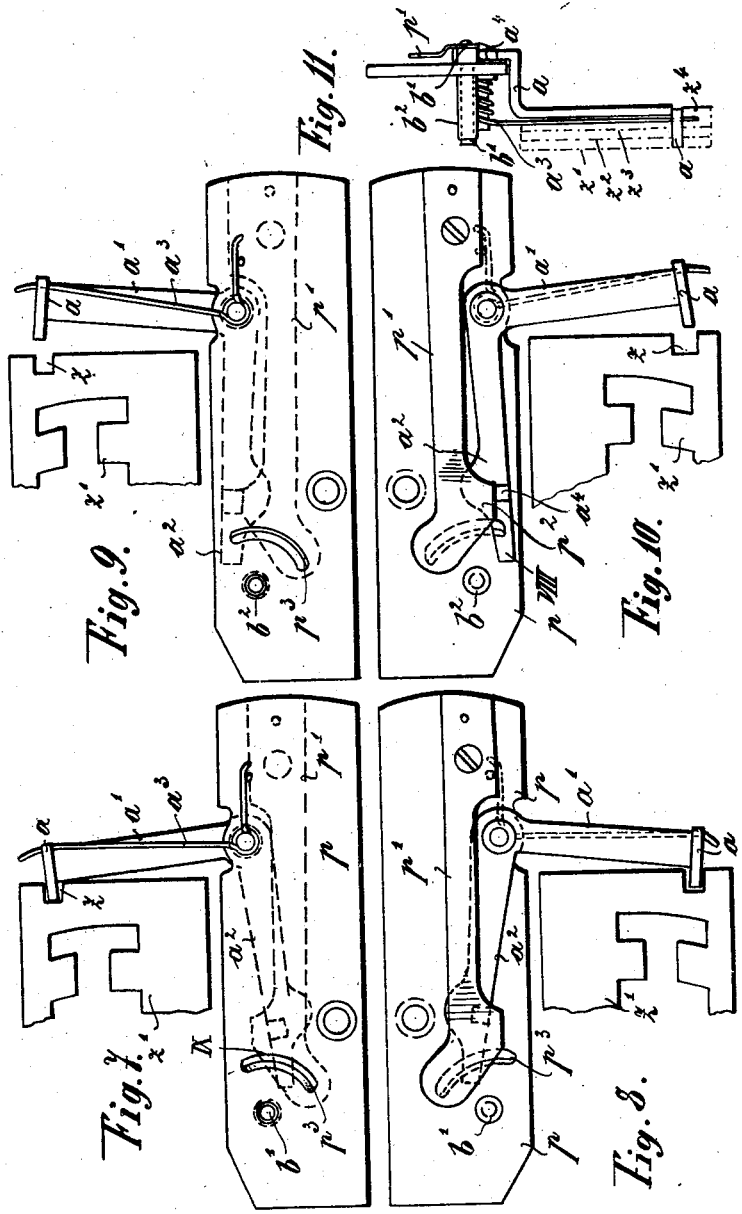

No. 703,429. Patented July 1, 1902.
C. KUNZELMANN.
LOCK.
(Application filed Aug. 20, 1898.)
(No Model.) 4 Sheets—Sheet 4.

Witnesses
Frank S. Ober
Geo. S. Kennedy

Inventor
Carl Kunzelmann
by M. A. Rosenbaum
Atty.

THE NORRIS PETERS CO., PHOTO-LITHO., WASHINGTON, D. C.

UNITED STATES PATENT OFFICE.

CARL KUNZELMANN, OF SÄCKINGEN, GERMANY.

LOCK.

SPECIFICATION forming part of Letters Patent No. 703,429, dated July 1, 1902.

Application filed August 20, 1898. Serial No. 689,092. (No model.)

*To all whom it may concern:*

Be it known that I, CARL KUNZELMANN, a subject of the Grand Duke of Baden, residing at Säckingen, in the Grand Duchy of Baden, in the German Empire, have invented certain new and useful Improvements in Locking Devices for Doors and the Like, (for which I have applied for patent in England, dated July 18, 1898,) of which the following is a specification.

This invention relates to locking devices for doors and the like, the object being to provide a lock which cannot be opened by unauthorized persons; and it consists of the arrangement of parts and the details of construction which I will now proceed to describe, reference being had to the accompanying drawings and to the letters and figures marked thereon.

Like characters refer to like parts in the various figures.

Figure 1:
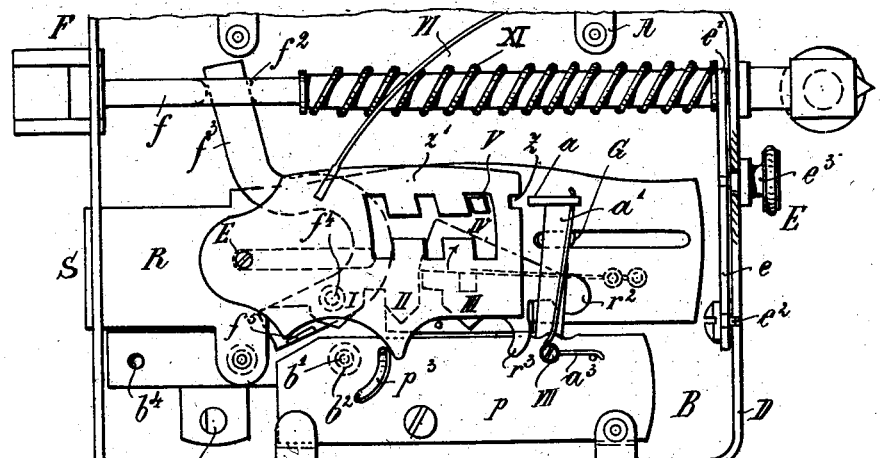
Figure 2:
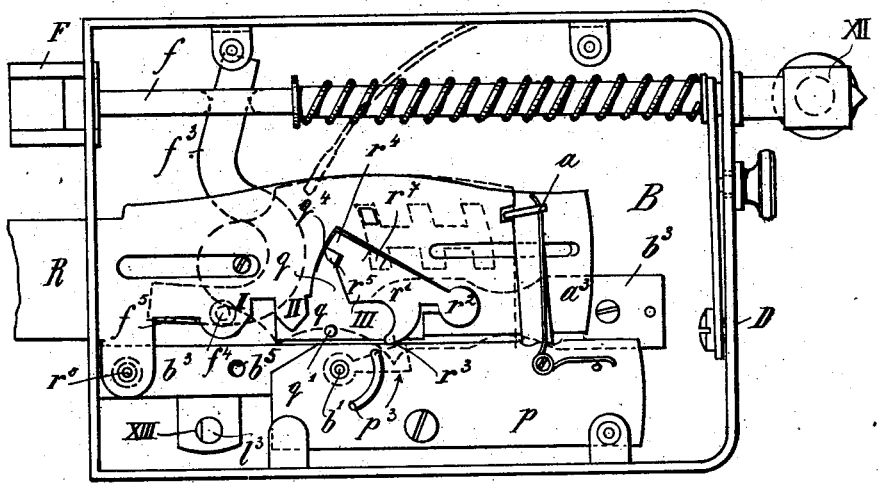
Figure 19:
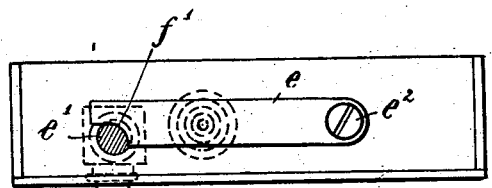
Figure 12:
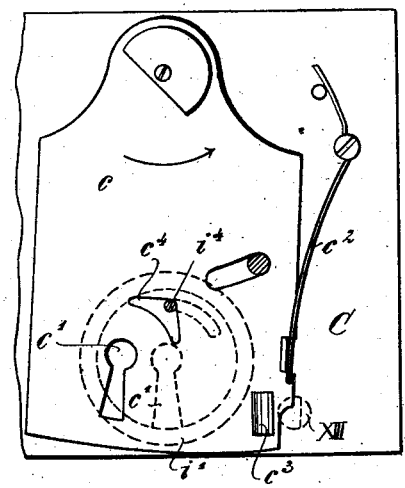
Figure 13:
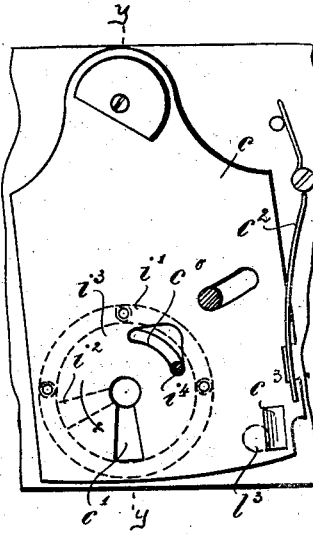
Figure 14:
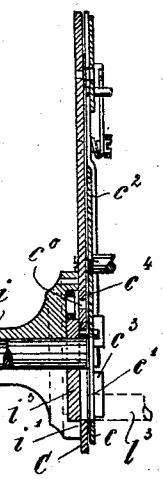
Figure 15:
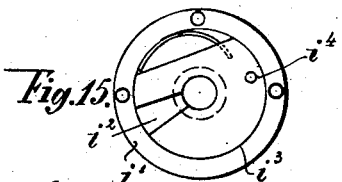
Figure 17:
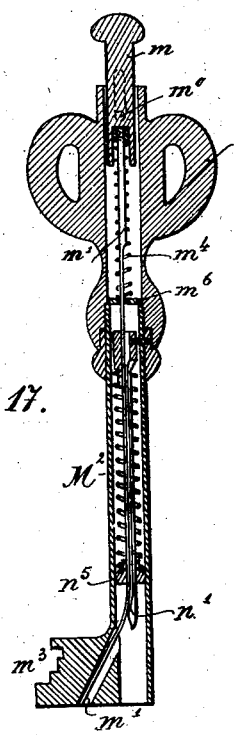
Figure 18:
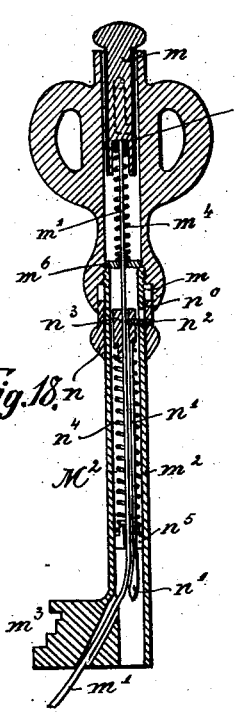

Figure 1 shows the lock with all its parts opened—i. e., with the bolt drawn back. Fig. 2 shows the lock with all its parts locked—i. e., with the bolt pushed forward. Fig. 3 shows the key when its pin does not protrude. Figs. 4, 5, and 6 show a safety device for the bolt of the lock, Fig. 4 being a front view of the bolt and safety device, Fig. 5 a rear view thereof, and Fig. 6 a sectional view on the line $x\,x$ of Fig. 4. Figs. 7 to 11 show the arrangement of the device for securing the levers or plates, Fig. 7 being a front view of the parts when locked, Fig. 8 a rear view thereof, Fig. 9 a view of the parts with the securing device disengaged, Fig. 10 a rear view of the same, and Fig. 11 a side view thereof. Figs. 12 to 16 show an arrangement for closing and locking the keyhole, Fig. 12 being a view of the parts when the keyhole is closed, Fig. 13 a view of the parts when the keyhole is open—i. e., when the hole in the covering-plate of the keyhole corresponds with the latter, so that the key can be inserted. Fig. 14 is a vertical sectional view on the line $y\,y$ of Fig. 13. Fig. 15 is a detail view of the keyhole-covering plate, and Fig. 16 a view of the key for this arrangement. Figs. 17 and 18 are enlarged sectional views of the key of my improved lock, Fig. 17 showing the pin in normal position and Fig. 18 when protruding over the bit. Fig. 19 is a detail view of the catch-locking device.

The casing of the lock consists of the frame D and the plates B and C, the latter forming the front and back of the casing. Frame D is provided with a number of lugs A, to which the plates B and C are secured by screws.

E and G represent two pins projecting from the plate B and serving to support the bolt R. The bolt R is a flat bar of iron of suitable form and is provided with slots for the pins E and G. In the lower edge of this bar a number of rectangular recesses are made. The projecting pieces 1 and 11, formed on the bolt between the recesses, together with a projecting piece 111, furnish a hold for the bit of the key, hereinafter described, by which the bolt R can be moved backward and forward. The edges of these projections are so shaped that the bit of the key may move smoothly past the same. The projection marked 111 is situated on a piece $r'$, pivotally secured to the bolt R and movable in the direction of the arrow IV. This piece $r'$ is held in the position shown in Fig. 1 by a spring $r^7$. In this position of the piece $r'$ the projection 111 is used for opening the lock. A projection $r^3$, likewise on the piece $r'$, is provided to enable the displacement of the projection 111 quite out of the reach of the key by the last half-revolution of the same, Fig. 2, and thus prevent the opening of the lock by any unauthorized person. The piece $r'$ is held in this position by the nose $q^4$ on a plate-spring $q^2$, secured to the bolt R. This nose $q^4$ is pressed down on turning this piece $r'$ and springs up beneath the part $r^4$ when it has been raised far enough. To enable the return of the piece $r'$ into the position shown in Fig. 1, the plate $q$, which is secured to the bolt R and supports the piece $r'$, is provided with a hole $q'$, through which a pin can be placed. The pin is provided in the interior of the principal key, from which it can be made to project by the means described below and press back the spring $q^2$, having the nose $q^4$, so that the part $r^4$ is released, and the piece $r'$ springs back into the position shown in Fig. 1 under the action of the spring $r^7$.

On the pin E four tumblers $z'$, $z^2$, $z^3$, and $z^4$, Fig. 11, are arranged on the front of the bolt R. These tumblers are each provided with three slots the direction of the length of which is concentric to the pin E. A horizontal slot connects these concentric slots together. Within these slots a pin V is arranged, and at every revolution of the key which raises the tumblers, as well as moves the bolt, the pin V passes from one slot to the other. The tumblers $z'$, &c., are so pressed downward by a spring VI that the pin V is normally situated in the vertical slots. On the end of each tumbler opposite to that of the pin E there is a rectangular slot, into which the nose $a$ of a catch-piece $a'$ engages for the purpose of preventing the raising of the tumblers, or, in other words, to prevent the locking or unlocking of the lock. The catch-piece $a'$ is of bell-crank form and rotates about the pin VII, secured to the plate P, which carries the hollow pin $b^2$, that guides the key. The free end of the part $a^2$ of the catch-piece $a'$ behind the fixed plate $p$ is provided with a nose $a^4$, on which the spring $p'$, which is likewise fixed to the plate $p$, presses. In the plate $p$ a slot $p^3$ is provided concentric to the pin $b^2$, through which the pin $m$, Figs. 17 and 18, when pressed out of the key can be passed. If now the catch-piece $a'$ is to be released—as, for example, in order to release the tumblers $z'z^2$, &c.—the extreme outer end of the part $a^2$, arranged underneath the plate P, is pushed aside or upward by a pin $m$, which, as will be described below, may be made to project from the key by pressing on the top of the latter. The edge of the nose $a^4$ of the catch-piece $a^2$ is caught by the spring $p'$, so that the automatic return of the catch-piece $a^2 a'$, which is under the influence of the spring $a^3$, is impossible. When it is desired to cause the catch-piece $a'$ to spring back again, it is only necessary to press back the spring $p'$ by the pin in the key, as by this means the edge of the spring $p'$ then releases the edge of the nose $a^4$.

The end of the longer arm of a lever $f^3$, pivoted on the pin $f^4$, secured to the part $l$ of the bolt R, engages in a correspondingly-formed hole of the bolt $f$, which represents the common catch. On turning the key the bit of the same presses the part $f^5$ of the shorter arm of this lever $f^3$ upward. By this means the bolt $f$ is drawn back and enables the opening of the door. One end of the bolt $f$ passes through the side of the casing and is provided with a handle XII and is normally held in the position shown in Fig. 1 by the spring XI. In this position the door is kept closed. The bolt $f$ is further provided with a transverse groove or notch at a suitable position, into which a lever $e$ can engage and prevent the movement of the same. Said lever is pivoted at one end to the side of the casing and can be turned by the knob $e^3$, situated without the casing.

To the back B of the casing a spring $b^3$ is secured, having a suitable form and provided with holes $b^4$ and likewise with a pin $l^3$. This spring further supports a pin $b'$, guided in the hollow pin $b^2$, and by pressing on the pin $b'$ the spring $b^3$ can accordingly be pushed backward. A pin $r^0$ engages in the holes $b^4$ and $b^5$ in the closed and opened position of the lock, respectively. By pressing back the spring $b^3$ the pin $r^0$ can be released from the holes $b^4$. On the inside of the front plate C there is a plate $c$, pivoted on a pin and held in the closed position by the spring $c^2$ and provided with a keyhole, Figs. 12 and 13. This plate has a projection $c^3$, the front projecting edge of which is moved behind and held by the edge XIII of the pin $l^3$ on the before-mentioned spring $b^3$ when the plate $c$ is turned for the purpose of revealing the keyhole.

On the outside of the front plate C there is a key-guide $i$, the plate-shaped end of which is hollow and contains a disk $i^3$, carrying a pin $i^4$. This plate $i^3$ has a hole $i^2$, corresponding in shape with the key. The pin $i^4$ passes through the front plate C and moves in a slot in the latter, so that on turning the disk the end of the pin $i^4$, projecting through the front plate C, moves the plate $c$ until the keyhole in the same coincides with that in the front plate, whereupon the upper edge of the part $c^3$ springs behind the edge of the pin $i^4$. The first key for opening the keyhole is consequently provided with a flat bit and is so constructed that when inserted into the sleeve $i$ it fills out the cut-away portion of the disk $i^3$ and rotates the latter on itself being rotated.

The principal key for the lock consists of a hollow shank $M^2$, on the one end of which the bit $m^3$, of a form to fit the tumblers $z'$, &c., is provided, whereas the other end is furnished with a thread on the outside, onto which the part $M'$ is screwed. Between the part $M'$ and the shank $M^2$ a plate $m^6$ is placed and serves as support for the spiral spring $m^4$, arranged within the sleeve $m^5$, supporting the pressure-button $m$. The pin $m'$, which is moved out of the bit $m^3$ on pressing upon the button $m$, is secured to the sleeve $m^5$. A sleeve $n^0$, guided in the shank $M^2$ by a pin $n^2$, holds the pin $n'$. This sleeve $n^0$ can be so moved by the ring D, likewise secured to the pin $n^2$, that the free end of the pin $n'$ is moved out of the key. The sleeve $n^5$ in the shank $M^2$ supports the spring $n^4$, by which the pin $n'$ is normally kept within the bore.

Figure 16:
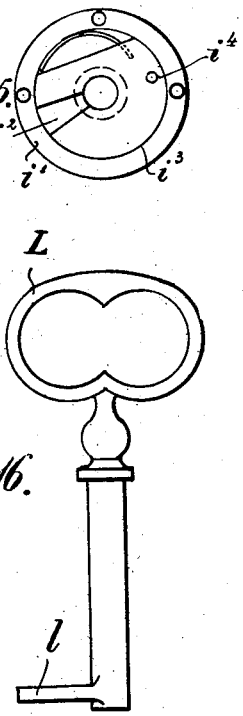

The lock is operated in the following manner: The first key, Fig. 16, is inserted into the part $i$ and the disk $i^3$ turned to the right, Fig. 12. By this means the plate $c$ is moved aside and held in the new position by the pin $l^3$ of the spring $b^3$. The principal key is then used. This key is turned in same direction as the first key, and the button $m$ is pressed at the same time. By reason of the pressure on the button $m$ the pin $m'$ of the key passes through the slot $p^3$ in the plate P, engages the end IX of the catch-piece $a'$, and so turns the same that the part $a$ is moved out of the transverse groove $z$ in the tumblers $z^2$, &c. On turning the catch-piece $a^1$ the nose $a^4$ is caught by the edge of the spring $p'$ and the return of the catch-piece is prevented. The ring $n$ of the key is now pressed forward, and the pin $n'$ of the key will then press back the spring $b^3$, which holds the pin $r^0$ of the bolt R, release this bolt, so that upon again turning the key the bolt can be moved out. Two revolutions of the key are made to throw the bolt, the tumblers being raised by the parts 1, 2, 3, and 4 of the key and the bolt being actuated by the part 5. The pin $r^0$ of the bolt R enters into the hole $b^4$ in the spring $b^3$. By turning the key again for a half-revolution to the right the piece $r'$ is moved upward by the pressure of the bit of the key against the projection IV, and it is held in this raised position by the nose $q^4$ of the spring $q^2$. In this position the return of the bolt R is impossible. Now by again pressing on the button $m$ of the principal key the pin $m'$ of this key is so inserted through the slot $p^3$ of the plate $p$ that the spring $p'$ is displaced, thus releasing the nose $a^4$, whereupon the part $a$ of the catch-piece $a'$ can spring into the transverse groove $z$ in the tumblers $z'$ $z^2$, &c., and so lock them. Before withdrawing the key the spring $b^3$ is pressed back by pushing on the ring $n$ or pin $m'$ of the key and the pin $i^3$. This releases the projection $e^3$ on the plate $c$, so that upon withdrawing the key this plate $c$ again closes the keyhole. For the purpose of opening the lock the keyhole is first opened by means of the preliminary key. When this has been done, the catch-piece $a'$ is turned back by means of the pin $m'$, provided in the bore of the principal key. By pressing out the pin $n$, likewise provided in the principal key, the free end of the said pin will pass through the hole $q'$ of the plate $q$ as soon as the correct position is reached and press back the spring $p'$. The nose $q^4$ then releases the part $r^4$ of the piece $r^0$, and this latter returns into the position shown in Fig. 1 under the action of the spring. After now pressing back the spring $b^3$ and releasing the pin $r^0$ of the bolt R by means of the pin $n'$ in the principal key the bolt can be pushed back again by turning the key twice. The pin $r^0$ then enters into the second hole $b^4$. The catch-piece $a'$ is brought into engagement in the known manner, and finally by pressing the pin $n'$ onto the spring $b^3$ the keyhole of the lock will be closed on the removal of the key. Owing to the proportionately large number of safety contrivances, this lock is especially suitable for the doors of safe rooms and the like.

Having described my invention, I claim—

1. In a lock, the combination of a sliding bolt, a spring-plate located adjacent thereto, a hollow key-guide, a pin carried by said spring-plate and projecting into said hollow key-guide, a pin or detent carried by said bolt, and holes or recesses in said spring-plate adapted to receive said detent and hold said bolt at one or the other of its extreme positions.

2. In a lock, the combination of a sliding bolt, having a projection thereon, a movable tumbler plate or plates having notches therein, the said projection being normally adapted to engage one or another of said notches and hold said bolt against movement, a detent engaging with said tumbler plate or plates, whereby said plate or plates may be held against movement, and means, adapted to be controlled by a suitable key, for removing said detent from said tumbler plate or plates, thus disengaging the latter from the bolt whereby said bolt may be moved.

3. In a lock, the combination of a sliding bolt having a projection thereon, a movable tumbler plate or plates having notches therein, the said projection being normally adapted to engage one or the other of said notches and so hold said bolt against movement, a rocking lever adapted to engage and disengage said tumbler plate or plates and permit or prevent movement of the same, a projection carried by said lever and a spring-plate adapted to engage said projection when said lever is disengaged from the tumbler plate or plates.

4. In a lock, the combination of a sliding bolt, a projection thereon, a pivoted tumbler plate or plates, notches therein, the said projection being adapted to engage one or the other of said notches, a bell-crank lever having a detent adapted to normally engage with said tumbler plate or plates and prevent movement of the latter, and means controlled by a suitable key whereby the said bell-crank lever may be moved and held in disengaged relation to said tumbler plate or plates so that the latter may be moved to release the bolt.

5. A locking device for doors and the like, comprising a key having a bit and a moving pin guided obliquely therein, intermediate securing devices between the bolt and the key, and a safety device with means for arresting it to prevent the movement of said intermediate securing devices when locked, said pin being adapted to engage the safety device; substantially as described.

6. A locking device for doors and the like, comprising a key having a bit, a moving pin guided obliquely therein, intermediate securing devices between the bolt and the key, and a safety device swinging in a recess of the bolt, and an arresting mechanism having a plate provided with a projection protruding into the path of the safety device, said plate being fixed elastically to the back of the bolt, so that it can be pressed back by means of the pin, substantially as described.

In testimony whereof I have hereunto set my hand in the presence of two witnesses.

CARL KUNZELMANN.

Witnesses:
A. M. LIEBERKNECHT,
JEEN SCHNEIDER.